United States Patent [19]

Sandercock

[11] 4,225,236
[45] Sep. 30, 1980

[54] FABRY-PEROT INTERFEROMETER

[75] Inventor: John R. Sandercock, Affoltern, Switzerland

[73] Assignee: RCA Corporation, New York, N.Y.

[21] Appl. No.: 850,663

[22] Filed: Nov. 11, 1977

[51] Int. Cl.³ .............................................. G01B 9/02
[52] U.S. Cl. ..................................... 356/346; 356/352
[58] Field of Search ............... 356/346, 352; 324/61 P

[56] References Cited

U.S. PATENT DOCUMENTS

| | | | |
|---|---|---|---|
| 2,381,728 | 8/1945 | Dimmick | 356/352 |
| 3,263,167 | 7/1966 | Foster et al. | 324/61 P |
| 3,373,651 | 3/1968 | Mack et al. | 356/352 |
| 3,488,123 | 1/1970 | Nichols | 356/346 |
| 3,999,854 | 12/1976 | Barrett | 356/346 |

FOREIGN PATENT DOCUMENTS 381054  8/1973  U.S.S.R. ................................. 356/352

Primary Examiner—Conrad J. Clark
Attorney, Agent, or Firm—Samuel Cohen; William Squire

[57] ABSTRACT

A vernier tandem Fabry-Perot interferometer includes a first pair of plane mirrors forming a first interferometer and a second pair of plane mirrors forming a second interferometer which is receptive of the output signal of the first interferometer. One mirror of each pair is mounted on a common movable support in positions such that when the support is moved in a given direction the spacing between one pair of mirrors remains in the same ratio to the spacing between the other pair of mirrors as the original ratio between these spacings. With this ratio maintained constant, the system continues to exhibit a single pass band at frequencies of interest corresponding to different spacings between mirror pairs. A deformable parallelogram maintains mirror parallelism while a transducer provides mirror motions. Other features are also disclosed.

18 Claims, 8 Drawing Figures

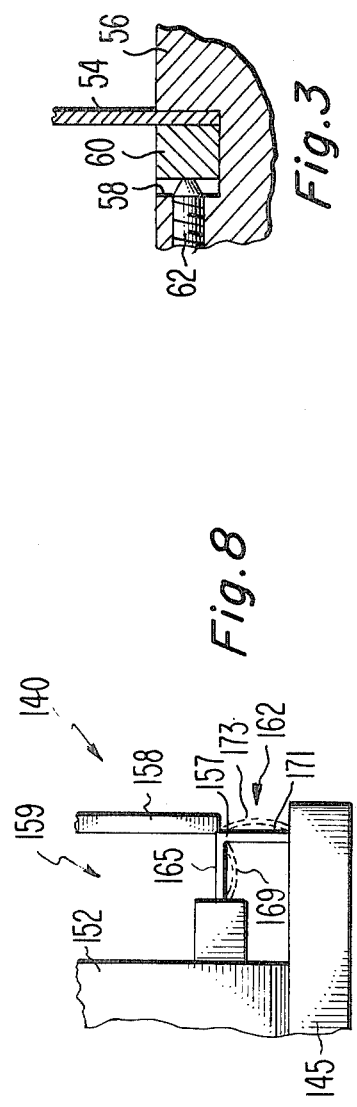
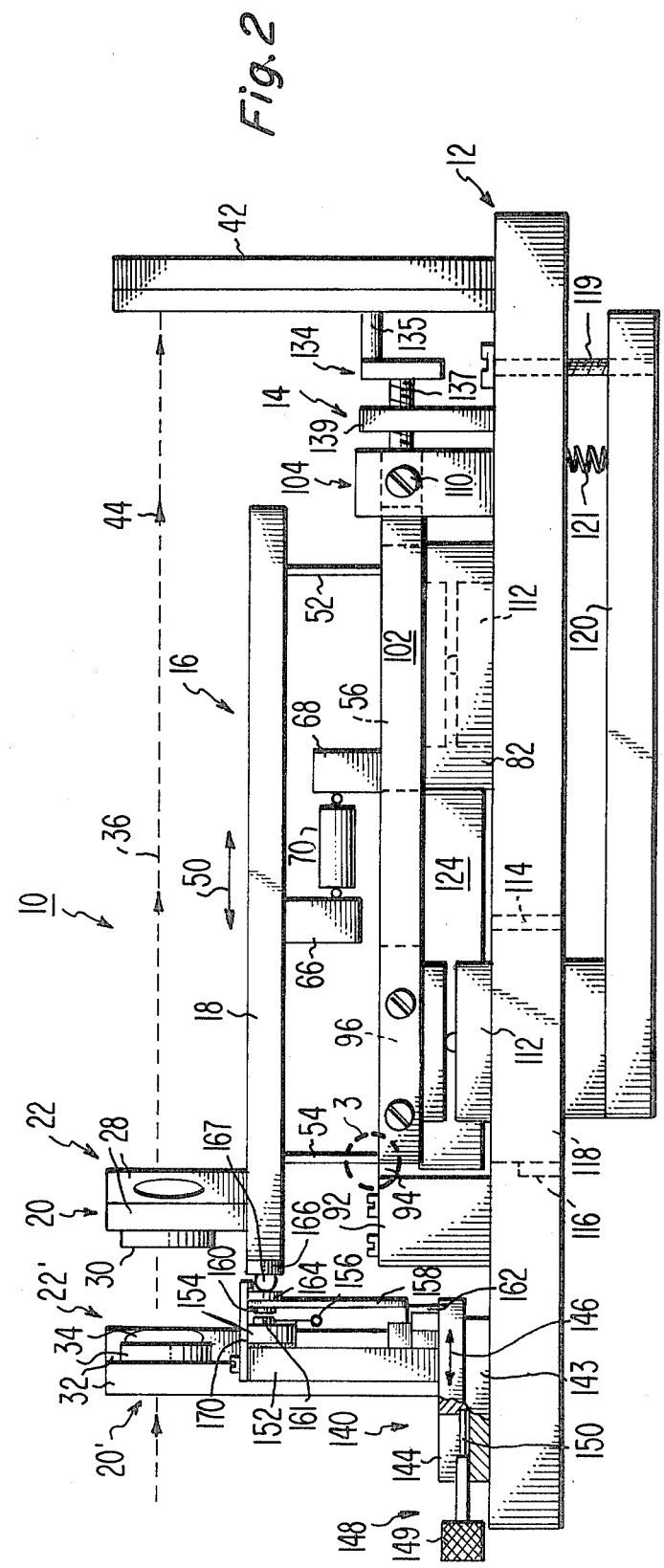

FABRY-PEROT INTERFEROMETER

Figure 7:
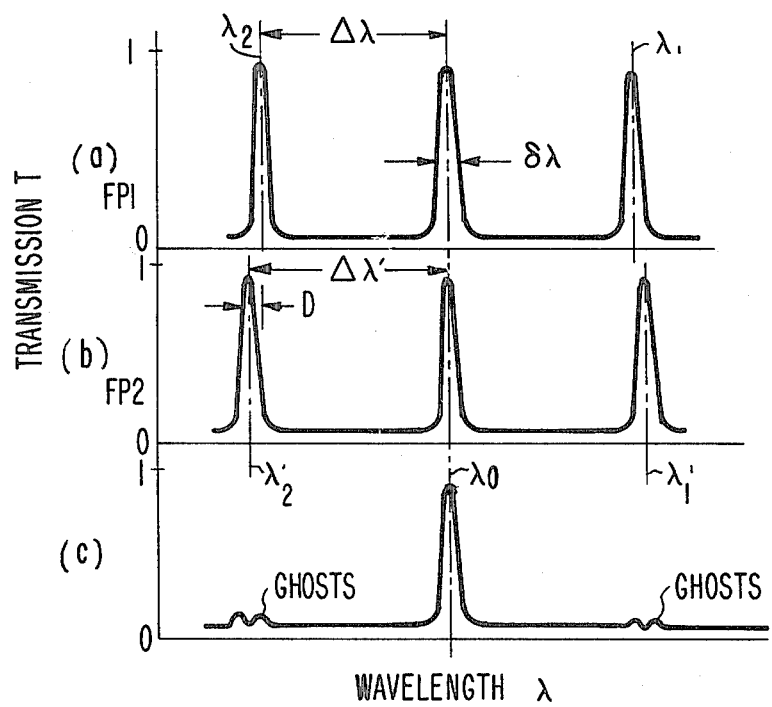

The present invention relates to Fabry-Perot interferometers. For high resolution spectroscopy where a resolution of MHz to GHz is required, a Fabry-Perot interferometer (FP) is used. The FP consists of two plane mirrors mounted accurately parallel to one another, with an optical spacing $L_1$ between them. For a given spacing $L_1$ the interferometer will transmit only certain wavelengths $\lambda$ as determined by $$T = \frac{\gamma_0}{1 + \frac{4F^2}{\pi^2} \sin^2 \frac{2\pi L_1}{\lambda}} \quad (1)$$

where $\gamma_0$ ($\leq 1$) is the maximum possible transmission determined by losses in the system, and F, the finesse, is a quality factor depending primarily on the mirror reflectivity and flatness. Equation 1 shows that only those wavelengths satisfying $$L_1 = P\frac{\lambda}{2} \quad (2)$$

for integral values of P, will be transmitted. This is illustrated in FIG. 7, curve a. The finesse F is related to the spacing between successive transmitted wavelengths $\Delta\lambda$ (known as the free spectral range, FSR) and the width $\gamma\lambda$ (or resolution) of a given transmission peak by $$F = \frac{\Delta\lambda}{\delta\lambda} \quad (3)$$

The FP is used as a spectrometer by varying the spacing $L_1$ so as to scan the light intensity at different wavelengths. However, it is immediately apparent that the measured intensity at a given spacing is the sum of the intensities at all wavelengths satisfying equation 2. An unambigous interpretation of the spectrum is thus impossible unless it is known that the spectrum of the light lies entirely within a wavelength spread $<\Delta\lambda$. Since $$\Delta\lambda = \frac{\lambda^2}{2L_1} \quad (4)$$

$\Delta\lambda$ may be made arbitrarily large by decreasing $L_1$. However, $\delta\lambda$ increases proportionally to $\Delta\lambda$ and so the resolution decreases. In fact, equation 3 shows that the ratio between FSR, $\Delta\lambda$, and the resolution $\delta\lambda$ is just the finesse F. In practice F cannot be made much greater than about 100 due to limitations on the quality of mirror substrates and coatings. The relationship between FSR and resolution is thus fixed within limits determined by the achievable values of F.

There exists a means of increasing the FSR at a fixed resolution by the use of two FP's in series. The most useful arrangement is a vernier system in which the spacing of the second interferometer $L_2$ is close to $L_1$. The transmission of this second interferometer is shown in FIG. 7, curve b, assuming $L_2/L_1 = 0.95$. The transmitted wavelengths are determined by $$L_2 = q\frac{\lambda}{2} \quad (5)$$

for integral values of q.

If the spacings $L_1$ and $L_2$ are independently set so as to transmit a given wavlength $\lambda_0$ then the combined transmission for light passing successively through both FP1 and FP2 will be as illustrated in FIG. 7, curve c. The neighboring transmission peaks do not coincide—only after 20 times the FSR of FP1 do the transmission peaks coincide again. Small "ghosts" of the intervening transmission peaks remain since the transmission of either interferometer as shown in equation 1 never falls exactly to zero. The FSR of the tandem system is thus increased by a factor 20 over that of the single interferometer, while the resolution $\delta\lambda$ remains similar. (The factor 20 is derived from the arbitrarily chosed ratio $L_2/L_1 = 0.95$). In order that the first ghost is not too obtrusive $L_1$ and $L_2$ are chosen such that $$F \gtrsim \frac{L_1}{L_1 - L_2}$$

To use the tandem interferometer system as a spectrometer, it is necessary to scan the two interferometers synchronously, by simultaneously changing the spacings $L_1$ and $L_2$. It is clear from equations 2 and 5 that to scan a given wavelength increment, the changes $\delta L_1$ and $\delta L_2$ must satisfy $$\frac{\delta L_1}{\delta L_2} = \frac{L_1}{L_2} \quad (6)$$

The magnitudes of $\delta L_1$ and $\delta L_2$ are typically 1 to a few microns ($\mu$m). The only known method of satisfying equation 6 is by use of pressure scanning wherein the pressure of the gas between the mirrors is changed. Remembering that L is the optical spacing of the mirrors (i.e., the spacing t multiplied by the refractive index n of the gas between the mirrors), L may be changed by changing the refractive index of the gas through a pressure change. Since $$L = nt$$

equation 6 is satisfied. The limitation of this method lies in the scanning range which is limited by the achievable refractive index change. Using air, a pressure change of one atmosphere will change L by only 3 parts in $10^4$, producing the same relative change in the transmitted wavelengths. Where much larger scans are required, the associated large pressure changes make the system inpracticable.

Although relatively large scans of several $\mu$m are possible using piezoelectric transducers there has been no successful attempt to make a tandem interferometer based on such a construction. Such a device would fail for two reasons. (1) Static synchronization—Synchronization requires that the mirror or optical spacings of the two interferometers are never allowed to depart from their corrective relative values by as much as 10 Å (angstroms). Stability of this order is hard to achieve, particularly since the two interferometers are physically separate. (2) Dynamic synchronization—The correct relative spacings must be maintained over a scan of several $\mu$m. Since piezoelectric transducers typically show non-linearities of the order of 100 Å per μm, it is difficult to maintain synchronization during the scan with prior art systems.

A mechanically scanned interferometer as is well-known in the art typically includes a first mirror which is mounted on three piezoelectric scanning transducer stacks and which is spaced a distance L from a second mirror. The latter is mounted on an angular orientation device whose purpose is to adjust the position of the second mirror to make it parallel to the first mirrors. The prior art structure employs three parallel, low coefficient of expansion rods which support the three piezoelectric scanning stacks. One mirror is attached in some suitable strain-free manner to the ends of the three scanning stacks. The second mirror is attached to the end plate of the prior art structure in such a way that it may be moved into a position approximately parallel to the first mirror by differential micrometer screws. The final vernier adjustment of the position of the mirrors is achieved by applying suitable bias voltages to the three scanning stacks. The instrument is then scanned by applying a scanning voltage simultaneously to all three scanning stacks.

While the interferometer described above does provide adequate performance under some operating conditions, there is still room for improvement. For example, since piezoelectric transducers are not entirely homogeneous, the three scanning stacks do not produce identical displacements and so the mirror tilts during the scan. This loss of parallel mirror alignment is serious for multipass operation of the interferometer.

In the system above, mirror spacing determines the resolution of the interferometer. When the coarse mirror spacing must be changed, the scanning mirror assembly must be slid as a whole along the three rods. As a result, mirror alignment is lost and the handling produces local temperature changes. The mirrors must be realigned with micrometer screws and finally with the bias voltages on the scanning stacks. Time must be allowed for the instrument again to come to thermal equilibrium. This coarse mirror alignment is particularly time consuming and the whole process very inconvenient.

The mean mirror spacing and the parallel alignment should not vary with time. This requires dimensional stability of the order of 10 Å. To meet this requirement it is necessary to build the instrument out of low expansion materials which are expensive both to buy and to machine.

The combination of non-linearity in the scan and rather poor stability makes the synchronous operation of two interferometers in tandem virtually impossible.

A tandem Fabry-Perot interferometer embodying the present invention includes first and second plane mirror Fabry-Perot interferometers whose mirrors are arranged such that the spacing between the mirrors of one interferometer differs from the spacing between the mirrors of the other interferometer sufficiently such that substantially only one pass band is passed by the two interferometers. Means are provided for altering the mirror spacings of both interferometers so that the ratio of the incremental change in the mirror spacings of each interferometer is equal to the ratio of the mirror spacings of each interferometer during the altering wherein essentially the one pass band is passed by the two interferometers during the altering. These and other features of the invention are discussed in greater detail below.

IN THE DRAWINGS

Figure 1:
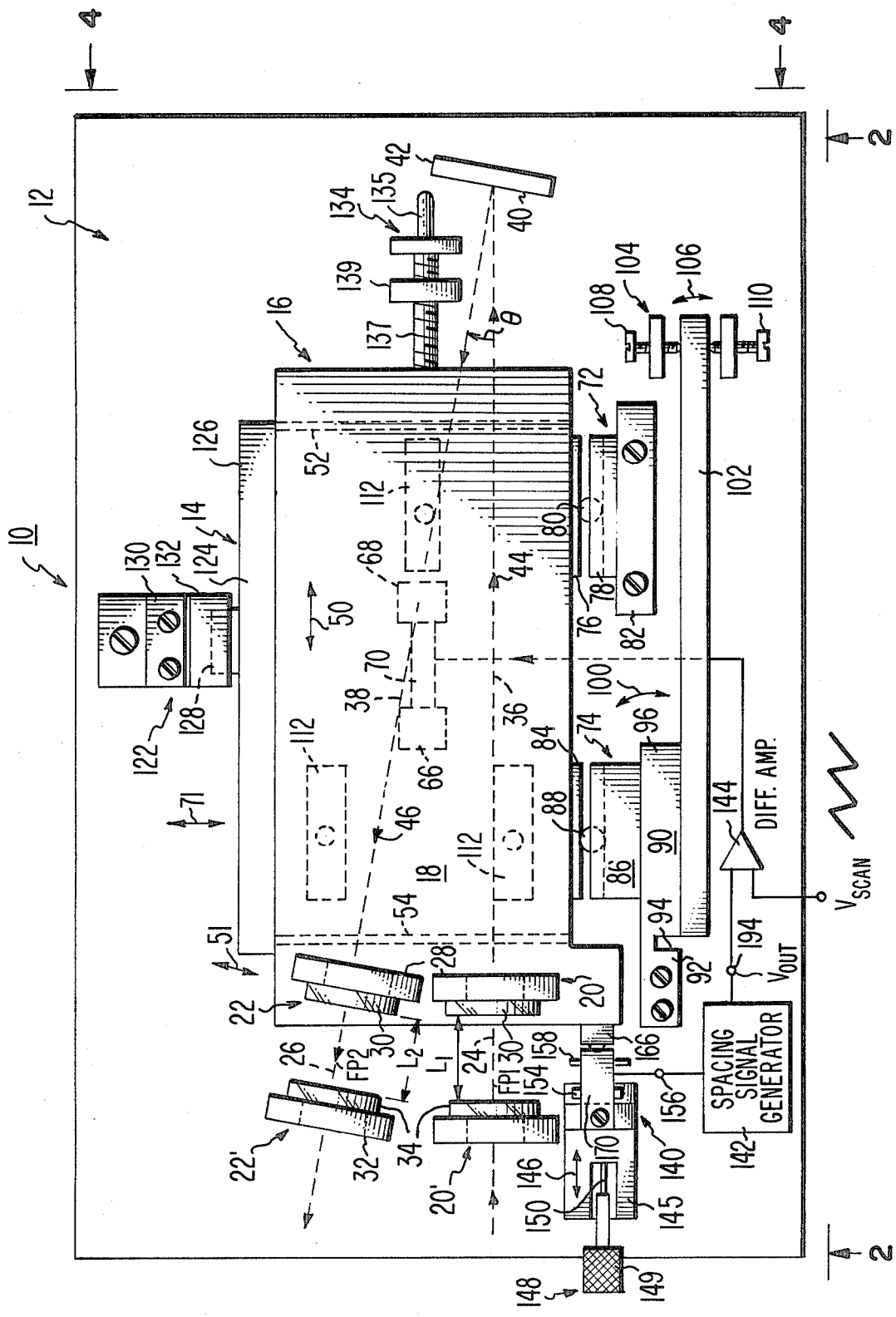
Figure 4:
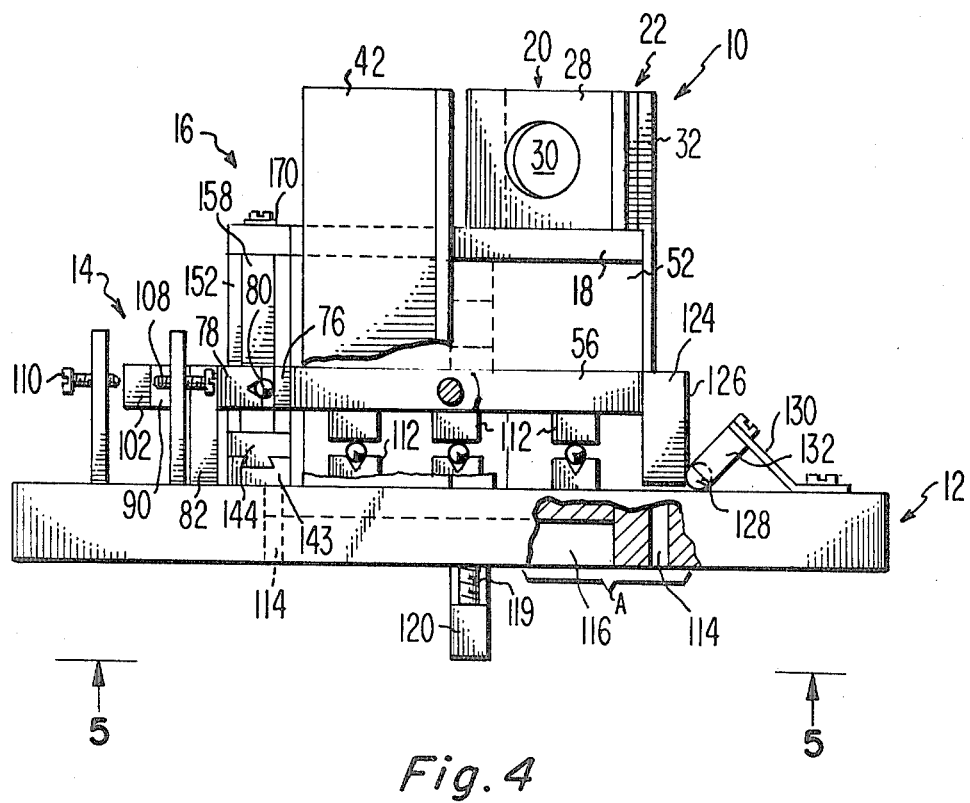
Figure 5:
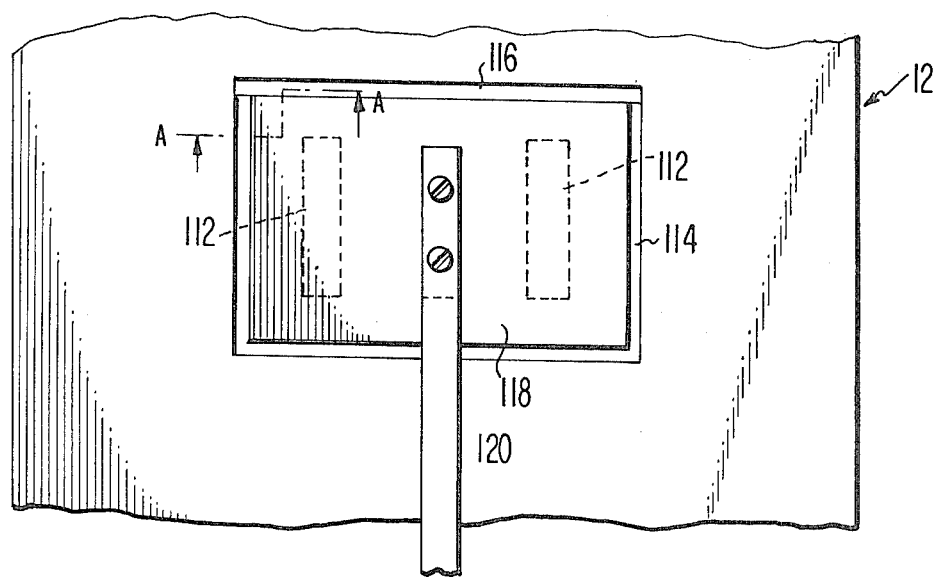
Figure 6:
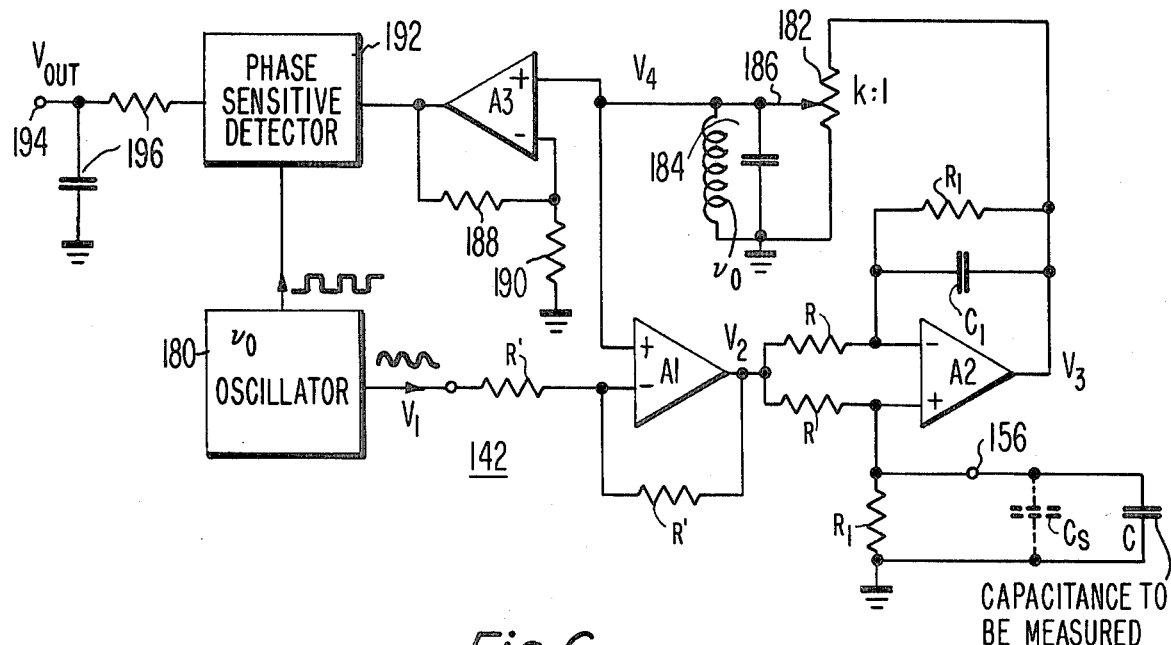

FIG. 1 is a plan view of an apparatus in accordance with an embodiment of the invention, FIG. 2 is a side elevational view of the apparatus of FIG. 1 taken along the lines 2—2, FIG. 3 is a detailed sectional view of a portion of the apparatus of FIG. 2 taken at the dashed circle 3, FIG. 4 is an end elevational partially fragmented view of the apparatus of FIG. 1 taken along lines 4—4, FIG. 5 is a bottom view of the apparatus of FIG. 4 taken along lines 5—5, FIG. 6 is a schematic diagram of the spacing signal generator of FIG. 1, FIG. 7 is a set of curves which illustrate the transmission characteristics of the embodiment of FIG. 1, and FIG. 8 is an enlarged side view of a portion of the capacitance transducer assembly of FIG. 1.

Vernier tandem interferometer 10 includes a base 12 mounted on suitable supports (not shown). Mounted on the base 12 is a coarse adjustment stage 14 which supports scanning stage 16. The scanning stage 16 includes a platform 18 on one end of which is mounted a pair of mirror assemblies 20 and 22. Mounted on the base 12 are mirror assemblies 20' and 22'. The assemblies 20 and 20' form a first Fabry-Perot interferometer (FP) optical cavity 24 while assemblies 22 and 22' form a second (FP) optical cavity 26.

Assemblies 20 and 22 are identical and each comprises a support 28 and a partially reflecting mirror 30 adjustably mounted on the support 28. Assemblies 20' and 22' are identical and each comprises a support 32 and a partially reflecting mirror 34 adjustably mounted on its corresponding support 32. Mirrors 30 and 34 are plane mirrors. The optical axis of cavity 24 is shown by the dashed line 36 while the optical axis of cavity 26 is shown by the dashed line 38. The supports 28 are placed as close together as possible so as that they are virtually touching each other to minimize thermal variations.

The reflecting surfaces of mirrors 30 and 34 which define cavity 26, lie in parallel planes as known in the FP art. Similarly, the reflecting surfaces of the mirrors of cavity 24 are also parallel to each other to the same degree as the surfaces of the mirrors of cavity 26. The planes of the mirrors of cavity 26 are at an angle $\theta$ to the planes of the mirrors of cavity 24. The optical axis 36 of cavity 24 intersects the optical axis 38 of cavity 26 at the reflecting surface 40 mirror 42 the angle between these axes being $\theta$. Mirror 42, which is mounted on the base 12 reflects the light beam passed by cavity 24 along axis 36 in direction 44, to the cavity 26 along axis 38 in direction 46.

While mirror 42 is illustrated for purposes of explanation as a plane mirror it will be appreciated by those skilled in the interferometer art that rectroreflectors including prisms and other devices which can provide multipass reflections to each of the cavities 24 and 26 may be used in the alternative. The angle $\theta$ may be in practice about 15° to 20°.

Hereinafter the Fabry-Perot interferometer of cavity 24 is designated FP 1 and of cavity 26, FP 2. The transmission characteristics of FP 1 are shown by curve a of FIG. 7 while the transmission characteristics of FP 2 are shown by curve b of FIG. 7. If the spacing between the mirrors 30 and 34 of FP 1 is $L_1$ then the spacing $L_2$ between the mirrors of FP 2 is made $L_1 \cosine \theta$, which is smaller than $L_1$. The spacings between transmission peaks of FP 1 is $\Delta\lambda$, which is a function of $L_1$. Due to the fact that the spacing $L_2$ between the mirrors of FP 2 is less than the spacing $L_1$ between the mirrors of FP 1, the spacings between the transmission peaks $\Delta\lambda'$ of FP 2 is slightly greater than the spacing $\Delta\lambda$ of FP1. Since the difference D between $\Delta\lambda$ and $\Delta\lambda'$ (FIG. 7) that is $\Delta\lambda'-\Delta\lambda$ is sufficiently great, very little of the energy at wavelength $\lambda_2$ of FP2 passed through the pass band centered at $\lambda'_2$ of FP2. Similarly, very little of the energy at $\lambda_1$ passed by FP1 passes through the pass band centered at $\lambda'_1$ of FP2. However, the band-passes at $\lambda_0$ are aligned in the two FP's and energy at this wavelength passes from cavity 24 along axis 36, is reflected from mirror 42 along axis 38 and passes through cavity 26. The combined transmission characteristic shown at c in FIG. 7 comprises a single transmission peak at wavelength $\lambda_0$ and "ghosts" representing small amounts of leakage appear in the neighborhood of $\lambda_2$ and $\lambda_1$. Thus, a vernier tandem scanning interferometer is provided by the mirrors of FP1 and FP2 and reflecting mirror 42. In scanning interferometers as is known, one mirror continuously oscillates in a direction normal to the mirrors a minute distance, usually in the order of microns. This shift in mirror position is hereinafter referred to as a scan.

As is now apparent, the spacing between the mirrors 30 and 34 of FP1 and FP2 initially may be established with $L_2/L_1$ equal to say 0.95, where $L_1$ is the spacing between the mirrors FP2. This ratio is somewhat arbitrary to the extent discussed earlier. Scanning stage 16 is mounted, as will be shown, to move in the direction 50 normal to the reflecting surfaces of the mirrors 30 and 34 of FP 1 and parallel to axis 36. Since the planes of mirrors 30 and 34 of FP2 are at an angle $\theta$ to the planes of the mirrors 30 and 34, respectively of FP1 and mirror 30 of FP 2 is mounted on the the same scanning stage as is the mirror 30 of FP 1, then the spacing of cavity 26 of FP 2 will shift in value by the value of cosine $\theta$ times the shift in the spacing of the mirrors of cavity 24 of FP 1. For example, assume the scanning stage 16 shifts to the left in the drawing in one of the directions 50 a distance $\Delta x$. This shift introduces a corresponding change $\Delta x$ in the spacing $L_1$ between mirrors 30 and 34 of FP 1 and change $\Delta x \cos \theta$ in the spacing $L_2$ between mirrors 30 and 34 of FP 2. Since $L_2$ is $L_1 \cos \theta$ the ratio of the magnitudes of the spacings $L_1$ and $L_2$ equals the ratio of incremental change in the spacings. Thus, it is seen that equation 6 above is satisfied by this structural arrangement. That is, spacings $L_1$ and $L_2$ of the interferometers FP 1 and FP 2, respectively, are proportional during a scan to any change in the spacings therebetween. Thus, both FP 1 and FP 2 are scanned by a single motion of stage 16.

Further, at all times the signal to be analyzed from FP 1 is reflected by the mirror 42 to the mirrors of FP 2 in a direction that is normal to the mirrors of each optical cavity. As long as stage 16 is moved parallel to axis 36 the angular orientation of mirror 30 of FP 2 remains fixed. Therefore, the plane of mirror 30 of FP 2 always is at angle $\theta$ to the plane of mirror 30 of FP 1, regardless the magnitude of the shift $\Delta x$ in the stage 16. This assumes negligible distortion in the mirrors and negligible misorientation due to mechanical misalignment. As will be explained, mechanical and thermal factors which could affect mirror alignment are considered later to maintain the mirror parallelism within the desired limits.

As the mirrors 30 are shifted in direction 50 with respect to the mirrors 34, while the mirrors forming cavity 26 of FP 2 remain parallel, the amount of mirror area which remains effective changes. In the position shown, for example, the projection of 30 of FP 2 in the direction 46 of optical axis 38 may exactly superimpose on 34 of FP 2. However, as the spacing $L_2$ increases or decreases then such a projection will overlap 34, that is an edge portion of the projection will extend beyond the edge portion of 34 of FP 2 and vice versa. These overlapping edge portions are not effective to reflect light from one mirror surface to the other along directions parallel to optical axis 38. The size of the mirrors of FP 2 in direction 51 determines, for example, the maximum distance $L_2$ they can be moved apart. With mirror diameters of 3 to 5 centimeters (cms), a scan of greater than 10 cms is easily possible, in principle. Since scan lengths in practice rarely exceed 10 $\mu$m the large range should be understood to be the range over which spacing $L_1$ may be adjusted without requiring a lateral repositioning (direction 51) of one of the mirrors of FP 2.

Platform 18 of the scanning stage 16 is mounted to move in directions 50. The movement of stage 16 is so precisely controlled, that is, it is made to conform so closely to the directions 50 normal to the mirror surfaces of FP 1, that the parallelism of mirrors 30 does not vary by more than 10 angstroms over the diameter of the mirrors during the scan. This accuracy is achieved by mounting the platform 18 as one side of a deformable parallelogram. Two relatively thin, strong but flexible metal sheets 52 and 54 (FIG. 2) mount the scanning stage 16 to the intermediate mounting plate 56 of the coarse adjustment stage 14. These sheets support plates 18 above plate 56. The sheets 52 and 54 however, are sufficiently flexible in the direction 50 to permit the plate 18 to translate in directions 50 with respect to the plate 56 in response to an applied axial force in directions 50.

To achieve the accuracy required for the parallelism of the mirrors 30 with respect to the mirrors 34, the flexing of the sheets 52 and 54 must be such that the translation of the plate 18 is in directions 50 without distortion and without skewing within 10 angstroms over the mirror diameter during the scan. This accuracy is achieved by making sheets 52 and 54 parallel to within 10 $\mu$m. It can be shown mathematically that the skew-free motion is maintained even if the heights of the sheets differ somewhat. That is, the parallelism between plates 18 and 56 is not critical. In one embodiment constructed in accordance with the present invention the distance between sheets 52 and 54 was approximately 20 centimeters and the sheets were parallel to within 10 microns. The distance between plates 18 and 56 was about 2 centimeters. The parallelism of the mirrors 30 to the mirrors 34 remained within a tolerance of about 10–20 angstroms over the mirror diameter even for a scan as great as 100 $\mu$m. Sheets 52 and 54 were made of spring steel of about 0.2 millimeters thickness and a width of about 10 cm.

FIG. 3 illustrates how the sheet 54 is held in place at one end. A slot 58 is formed in plate 56 and insert 60, flush with the upper surface of plate 56, clamps sheet 54 to plate 56 via clamping screw 62. The upper surface of plate 56 is flush with insert 10 to provide an accurate location for the bending fulcrum of sheet 54. The upper end of sheet 54 may be similarly secured to platform 18 and sheet 52 may be held in place similarly to sheet 54.

Secured to the under surface of platform 18 is vertical post 66 which is in line direction 50 with vertical post 68 which is secured to plate 56. Mounted between the posts 66 and 68 is piezoelectric transducer 70 which may be a tube or, in the alternative, a stack of transducers. The transducer 70 is mounted with suitable magnetically coupled ball connections to the posts 66 and 68. The magnetic coupling mechanically secures transducer 70 to posts 66 and 68 via ball connections at the transducer ends without introducing any stresses or angular distortions as transducer 70 expands and contracts (and possibly bends due to nonuniformities) in response to an applied scan signal. The balls may seat in suitable recesses in posts 66 and 68. The magnetic forces in rings fixed to the ends of transducer 70 provides the connection forces for the assembly.

A scan signal applied to the transducer 70 translates platform 18 in the directions 50. The transducer 70 provides the actual driving forces while the flexing of the sheets 52 and 54 keeps the mirrors parallel during translation. The device which provides the scan signal will be explained later in connection with the circuit of FIG. 7 and the feedback circuit disclosed in FIG. 1.

While the displacement caused by the transducer 70 provides scanning of particular wavelength regions by shifting the mirrors 30 a distance in the order of microns, it is also desirable to provide coarse adjustment of the mirrors 30. The coarse adjustment alters the mean spacing between the the mirrors 30 and the mirrors 34 thus changing the resolution $\delta\lambda$ of the interferometers. The mean spacing may have a value anywhere in the range of a few microns to a few centimeters. Further, it is desirable that the coarse setting of the mirror spacing within this range be achieved without altering the parallelism of the mirrors by more than a half micron over the mirror diameter. During a scan of, for example, 10 microns, the mirrors move parallel to each other within a few angstroms over the mirror diameter. During the coarse alignment when the mirrors move parallel to within a half of a micron over the mirror diameter the mirror alignment is so little altered that strong special features are still discernable in the scan spectrum. In this case, a fine mirror adjustment using piezoelectric alignment transducers (not shown) can bring the mirror back into full alignment, i.e., the transmitted intensity is maximum at a given wavelength when the mirrors are accurately aligned.

Coarse alignment stage 14 is provided to effect translation of the scanning stage 16 without altering the parallelism of the mirrors more than one-half micron over the mirror diameter. This stage employs a plurality of linear roller bearing assemblies in which the respective races are all parallel to the axis 36 and straight to that degree required to maintain the desired parallelism of the mirrors. Two of the assemblies 72 and 74, shown most clearly in FIG. 1, prevent lateral translation of the plate 56 with respect to the base 12 in a direction 71 transverse to axis 36. Assembly 72 at one edge of plate 56 comprises a flat plate race 76 secured to plate 56 and a v-shaped grooved race 78 mounted on support 82 which is secured to base 12. A suitable single ball bearing 80 (representing one or more ball bearings) is disposed between the two races.

Assembly 74 includes a flat plate race 84 secured to the same edge of plate 56 as race 76 and a v-grooved race 86. A ball bearing 88 (also representing one or more ball bearings) is located between these races. Race 86 is mounted to moveable arm 90. Arm 90 is mounted at one end 92 to base 12. A slot 94 is cut in arm 90 and the end 96 of the arm is pivotable about slot 94 in the direction 100 with respect to end 92. End 96 is cantilevered above base 12 from end 92. Race 86 is mounted to end 96. End 96 is mounted to elongated lever arm 102. The position of the end of lever arm 102 can be changed in the directions 106 by adjustment assembly 104. In operation, the screws 108 and 110 are adjusted to make the v-shaped groove of race 86 parallel with the v-shaped groove of race 78.

As seen in FIGS. 1 and 4, three bearing assemblies 112 of like construction support plate 56 on the base 12. The bearing assemblies 112 are similar to construction and include a flat plate race attached to the underside of plate 56 and race with a v-shaped groove attached to the upper surface of the base 12. A ball bearing (representing one or more ball bearings) is disposed between the two races. The races of the ball bearing assemblies 112 are parallel to one another to provide translation of mirrors 30 with the accuracy described above. The structure which makes it possible to obtain such parallel alignment includes a u-shaped opening 114, FIGS. 4 and 5, formed in base 12 around two of the three assemblies 112, as shown. It includes also a groove 116 which extends partially through the base 12 and which terminates at opposite ends at the respective ends of the u of opening 114. That portion 118 of the base enclosed by the groove 116 and u-shaped opening 114 is moveable and pivots with respect to the base 12 by way of the hinge formed by the groove 116. A lever arm 120 is attached to portion 118 for effecting the parallel alignment of the assemblies 112. A suitable adjustment structure including screw 119 which adjust the position of the end of the lower arm 120 relative to base 12 and spring 121 which biases the lever arm relative to the base 12 achieves such an alignment. The parallelism of the bearing assemblies 112, 72, and 74 are such that the displacement of the plate 56 over a distance of two and one-half centimeters does not alter the parallelism of mirrors 30 and 34 by more than one-half a micron over the mirrors 30 diameter.

To prevent vibration from causing undesirable motion of the plate 56, a friction assembly 122 is provided. The friction assembly 122 includes a rectangular block 124 secured to an edge of plate 56 and formed with its outer surface 126 parallel to the races of the bearing assemblies which are all parallel. Block 124 depends downwardly from the edge of plate 56 to which it is secured as shown. The block 124 is spaced slightly above the base 12 to provide clearance. A cylindrical bearing 128 is biased against surface 126 of block 124 and the upper surface of base 12 by spring 130 and intermediate member 132. The member 132 has a cavity which receives the cylindrical bearing 128. Member 132 restrains bearing 128 from moving in the directions 50 relative to member 132. Assembly 122 provides friction and other forces between the bearing 128, base 12 and surface 126. These forces prevent undue slack between the plate 56 and base 12 and prevent vibration of the plate 56 due to such slack.

A suitable crank assembly 134, which is cutaway in the view of FIG. 4 for the purposes of simplicity of illustration, provides the coarse adjustment of the intermediate plate 56 with respect to base 12. The assembly 134 comprises a handle 135 mounted on a threaded shaft 137. Shaft 137 is threaded to support 139 secured to base 12. Shaft 137 is captivated in plate 56. Rotation of shaft 137 moves plate 56 in directions 50. In the alternative, an electric motor and drive mechanism can be connected to the shaft 137 for displacing the plate 56 in the directions 50 by electrical means. Shaft 137 could be driven by the motor via suitable gearing. The motor itself could be driven via a suitable electronic control. Other drive means could also be connected to plate 56 to effect motions in directions 50 such as rack and pinion arrangements or other mechanical drive linkages.

In the prior art a typical mirror construction as discussed in the introduction portion of this application requires three piezoelectric stacks for driving one of the FP mirrors with respect to the other mirror. The one mirror is mounted directly to the three stacks which are then mounted to a suitable support. However, the voltage-displacement characteristics of the stacks are normally not identical which results in tilting of the mirrors with respect to each other during the scan. In one aspect of the present invention, the scanning transducer 70 provides only the drive forces whereas the flexible sheets 52 and 54 determine the parallelism of the translation, eliminating the effects of the prior art distortions.

However, even with such a construction the transducer 70 may still exhibit non-linearities of displacement with respect to the applied scan signal. Ordinarily, a scan signal has an instantaneous voltage which is determined to provide a given spacing of the resonant cavity of the interferometer in accordance with a desired scan mode. Unfortunately, scanning peizoelectric transducers do not always follow the amplitude of the scan signal accurately. In most piezoelectric scanning transducers, there is, in fact, a non-linear relationship between the actual translation of the transducer and the amplitude of the scan signal. Therefore, the actual displacement of the mirrors 30 with respect to the mirrors 34 due to the transducer 70, may be non-linear with respect to the scan voltage unless otherwise provided for.

In the present system a feedback circuit and apparatus is provided for continuously comparing the actual spacing of the mirrors 30 and 34 with the spacing called for by the scan signal then being applied. If in fact, the mirror spacing is not what it is supposed to be, then the feedback circuit alters the signal applied to the transducer 70 to make the mirror spacing equal to that called for by the scan signal. The actual mirror spacing is indicated by a capacitance transducer (FIG. 2) assembly 140 which includes a first capacitor plate 161 fixed to the support for mirror 20 and a second capacitor plate 160 whose position is controlled by the supporting structure for mirrors 30. The spacing signal generator 142 (FIGS. 1 and 6) continuously measures the capacitance of assembly 140 and provides an output signal $V_{out}$ which is a measure of the spacing between plates 160 and 161. High gain differential amplifier 144 continuously compares the spacing signal $V_{out}$ with the scan signal $V_{scan}$ and provides a signal to the transducer 70 which maintains the spacing between the mirrors 30 and 34 equal to the spacing corresponding to the instantaneous value of the $V_{scan}$ signal.

The capacitance assembly 140 includes a base member 143 which is mounted on base 12. A slide member 145 is dove-tailed to the member 143 for translation in the directions 146 parallel to directions 50. Micrometer screw assembly 148 has its outer casing secured to member 143 and its movable spindle 150 in abutment with member 145. When the knob 149 is rotated, the spindle 150 moves in the axial direction (parallel to 146). The end of the spindle abuts the slide member 145 and causes it to move relative to base member 143 in the same direction. Upstanding support 152 is fixed to slide member 145. Glass plate 154 is secured to the support 152 by a suitable adhesive. An electrically conductive coating is deposited on a face of the glass plate 154 to form one plate 161 of the capacitor, FIG. 2. This electrode is connected to the spacing signal generator 142 via terminal 156.

An upstanding resiliently mounted member 158 has mounted thereon a second glass plate (not shown) on which is coated an electrically conductive layer forming a second plate 160 of the capacitance. This electrode is electrically grounded to the system ground. The two plates 160 and 161 are spaced from one another forming a capacitor. The two plates may be made parallel by pressing plate 160 against plate 161 while the adhesive securing glass plate 154 is still soft. The distance between the two capacitor plates may be, for example, nominally about 20 $\mu$m.

The upstanding member 158 is mounted on a fairly stiff flexible angle hinge 162, FIG 8. Hinge 162 may be formed of sheet metal bent at a right angle. One leg 165 of the hinge is secured at one end to upstanding member 152 and the other leg 171 is secured at one end to the slide member 145. The other ends of the legs form corner 157 of the hinge and are fixed to the bottom edge of member 158. Rotation of member 158 in direction 159 rotates member 158 about a pivot axis located along the intersection of the legs 165 and 171 (into the drawing, FIG. 8). During this rotation, leg 165 flexes downwardly as shown dashed at 169. At the same time leg 171 flexes to the right as shown dashed at 173. These flexing actions permit rotation of the member 158 as if mounted on a hinge. The flexing action however, provides spring bias to the legs of the hinge 162 tending to return the legs of the hinge to the quiescent position shown in solid line. Rotation in a direction opposite to direction 159 can be achieved also. This results in flexing of legs 165 and 171 in directions opposite to that shown.

Member 158 has plate 160 secured to its upper end as shown. Mounted on the side of the member 158 opposite plate 160 is steel plate 164. Secured to platform 18 is a magnetic ring 166 which releasably connects metal plate 164 via the ball bearing 167 to platform 18. Thus, when displacement of platform 18 (and mirrors 34) in the order of 10 microns occurs, the capacitor plate 160 follows that displacement. Therefore, the capacitance of the assembly 140 is a measure of the distance that the platform 18 is displaced with respect to the upstanding member 152, which is secured to the base 12 via micrometer adjustment assembly 148. The capacitance thus is used to determine the departure of the spacing between mirrors 30 and 34 from the nominal value set up by micrometer assembly 148.

When a coarse increase in mirror spacing is made by the crank assembly 134, the magnetic coupling between platform 18 and upstanding member 158 of the capacitance assembly 140 is broken. This is achieved by a suitable restraining member 170 which has a lip at its free end which engages the steel plate 164 at the top of the member 158 and prevents member 158 from moving more than a given distance to the right when the platform 18 is displaced away from assembly 140. The limited movement of member 158 simplifies the attachment of a light weight flexible cover (not shown) over the capacitor plate substrates to prevent ingress of dust into the gap between the capacitor plates.

FIG. 6 illustrates circuit 142. It includes a high frequency oscillator 180 of frequency $\nu_0$ typically 10 KHz which applies a sinewave signal to the inverting input of operational amplifier A1 through resistance R'. A second resistor R' connects the output terminal of amplifier A1 back to its inverting input terminal in a feedback loop. The value of both resistors R' may be 10 KΩ, for example. The output voltage $V_2$ of A1 is applied through two equal resistances R to the inverting and non-inverting inputs of operational amplifier A2. In the present example, the resistance R has a value of 10 k ohms.

The non-inverting input of amplifier A2 is connected through resistance $R_1$ to system ground. Across resistance $R_1$ are stray capacitance $C_s$ shown dashed and capacitance C which represents the capacitance of plates 160 and 161. The output of amplifier A2 is a voltage $V_3$ which is applied to inverting input amplifier A2 through parallel resistance $R_1$ and capacitance $C_1$. $C_1$ is a reference capacitance. Resistance $R_1$ in the present example may have a value of 10 megohms while capacitance $C_1$ may have a value of 100 picofarads.

The output of amplifier A2 is applied to the non-inverting input of operation amplifiers A1 and A3 through a variable resistance 182. An inductance-capacitance (L-C) filter 184 is connected between one end of resistance 182 and its center tap 186 and system ground. Filter 184 has resonant frequency $v_0$ for ensuring only a signal, voltage $V_4$, at resonant frequency $v_0$ is applied to the input of amplifier A1.

A suitable feedback resistance 188 is connected between the output and inverting input of amplifier A3. The inverting input is also connected to system ground through resistance 190. The output of amplifier A3 is applied as one input to phase sensitive detector 192. A squarewave signal having a frequency $\mu_0$ generated by oscillator 180 in phase with the sinewave output is applied as a second input to the phase sensitive detector 192. Oscillator 180 includes means for converting a sinewave to squarewave in phase with the sinewave. The output of detector 192 is applied to the $V_{out}$ terminal 156 through a suitable RC ripple filter 196. The phase detector 192 provides an output signal which is substantially a DC level representing the spacing of the plates of the capacitance to be measured.

The voltage $V_3$ has a value which depends on the ratio of the sum of the transducer capacitance C formed by plates 160 and 161 plus the stray capacitance $C_s$ to reference capacitance $C_1$ as follows:

$$V_3 = V_2 \left[ 1 - \frac{C + C_s}{C_1} \right] \quad (7)$$

provided $$2\pi v_0 << \frac{1}{RC_1},$$

where R is the value of the input resistors to amplifier A2. The resistors R1 provide balanced DC bias conditions for amplifier A2. Their AC effect on the bridge (formed by capacitance C and C1) is negligible. A fraction k of $V_3$ ($V_4 = kV_3$) is fed back to amplifier A1 so that $$V_2 = 2V_4 - V_1 \quad (8)$$

where $V_1$ is the (fixed) amplitude of the signal, produced by oscillator 180 which drives the circuit. The LC parallel combination 184 in the feedback loop ensures that only the signal at frequency $v_0$ is fed back, thus avoiding instability in the loop. The effect of the feedback loop is to compensate for the stray capacitance $C_s$ and at the same time produce a voltage proportional to the reciprocal of C. The manner in which this is achieved is seen from the expression for $V_4$ obtained from equations 7 and 8, remembering $V_4 = kV_3$, $$V_4 = \frac{-kV_1 \left[ 1 - \frac{C + C_s}{C_1} \right]}{\left[ 1 - 2k \left( 1 - \frac{C + C_s}{C_1} \right) \right]} \quad (9)$$

It is apparent that k may be so adjusted as to leave the denominator equal to $$\frac{2kC}{C_1}.$$

With this value of k, $V_4/V_1$ is thus equal to a constant term plus a term proportional to $1/C$.

This is however not exactly the right adjustment for k because, due to edge effects, the capacitance C is not exactly inversely proportional to the plate (plates 160 and 161) separation t. A good approximation is $$C = \frac{A\epsilon}{t} + C_e \quad (10)$$

where A is the plate area, $\epsilon$ the dielectric constant and $C_e$ a small constant correction for edge effects. This approximation is good provided that the lateral dimensions of the plates 160 and 161 (of order $\sqrt{A}$) are very much greater than their spacing t. Substituting equation 10 into equation 9 gives $$V_4 = -\frac{V_1}{2} \left[ \frac{C_1 t}{2kA\epsilon} - 1 \right] \quad (11)$$

provided that k is adjusted to give $$1 - 2k \left( 1 - \frac{C_e + C_s}{C_1} \right) = 0 \quad (12)$$

Thus the correct adjustment of k leads to a linear relationship between $V_4$ and t. The output voltage $V_{out}$ is a DC signal of amplitude G $V_4$, where G is the combined gain of the amplifier A3 together with the phase sensitive detector 192.

Equation 11 shows that $V_4$ is proportional to t plus a constant term. This result as described above for a parallel plate condensor will also apply for the hinged condensor described hereinabove, although the constant of proportionality will differ slightly for non-parallel plates.

It is apparent that other capacitance structures may be provided in place of assembly 140. For example, the hinged assembly can be replaced with a capacitor assembly having capacitor plates which always remain parallel. This can be achieved by placing one capacitor plate on platform 18 and a second plate spaced from and parallel to the one plate on plate 56. The second capacitor plate can be mounted on a suitable upright support fixed to plate 56. In this construction the capacitor plate spacing is only altered by the movement of platform 18 with respect to plate 56 in the scanning mode. Coarse adjustment of plate 56 with respect to base 12 will not affect the spacing of the capacitor plates in this construction.

The output of the spacing signal generator 142 is accurately proportional to the spacing between plates 160 and 161. By comparing the scan voltage $V_{scan}$ with the signal $V_{out}$ produced by the spacing signal generator, a correction voltage is generated for driving the piezoelectric scanning transducer 70. This system achieves two goals.

First, the linearity of the scan is determined only by the linearity of the displacement transducer assembly 140 and is independent of non-linearities in the scanning transducer 70. Second, high stability is achieved with respect to the thermal expansion. As seen in FIG. 1, the only paths which are thermally important are those in short distance between the mirrors 30 and 34 supports 32 and the capacitor C formed by plates 160 and 161 (including the micrometer screw assembly 140). Any thermal expansion in the rest of the structure is entirely compensated for by the feedback system, allowing the structure to be made of aluminum instead of invar or other low thermal expansion materials as used in the prior art.

The correct setting of the linearity adjustment k is obtained by the following procedure. A scan voltage $V_{scan}$ being a sawtooth voltage, is applied so as to scan about 10 peaks (orders) of a monochromatic beam incident on the mirrors of FP 1. The output of FP1 as a function of $V_{scan}$ is measured with a light detector to obtain a spectrum of the form of FIG. 7 curve (a) but showing about 10 peaks (orders) rather than the three peaks depicted there. k is adjusted until the peaks occur at equal increments of $V_{scan}$.

The signal $V_{out}$ as measured on an interferometer built in accordance with the present invention has a sensitivity of about 10 angstroms in a 100 Hz bandwidth and a linearity of approximately 1 angstrom per micron.

Before using the interferometer the following, or similar, setting up procedure should be carried out. Firstly, using crank assembly 134, the translation stages 14 and 16 are advanced until $L_1=0$, i.e., until the mirrors of FP1 touch and are parallel (the micrometer assembly 148 must be backed up to allow this movement). Now the non-scanning mirror 34 of FP2 is adjusted in position until $L_2=0$. This simultaneous setting of $L_1$ and $L_2$ equal to zero ensures that FP1 and FP2 will scan synchronously for any subsequently chosen value of $L_1$. With $L_1$ still equal to zero, the micrometer 148 is advanced until the capacitor plates 160 and 161 reach their nominal spacing (typically 20 m) corresponding to $V_{out}=0$. By suitable means the micrometer assembly 148 is now set to read 0.

The interferometer may now be operated. Using crank assembly 134 the mirror spacing is increased beyond that desired. Micrometer assembly 148 is set to the desired spacing value, and using crank assembly 134 the mirrors brought towards each other until the spacing signal generator 142 gives $V_{out}=0$. The mirrors of FP1 are now spaced at the value shown on the micrometer assembly 148, which value corresponds to the desired resolution. At this time a scanning voltage $V_{scan}$ is applied to differential amplifier 144. Voltage $V_{scan}$ is accurately predetermined in a well-known manner for providing the desired scan of mirrors 30 with respect to mirrors 34. The spacing signal generator 142 converts the spacing $L_1$ into a signal representing the value of that spacing. The differential amplifier 144 compares the $V_{scan}$ signal with the spacing signal $V_{out}$ and produces the signal to drive transducer 70, thus, producing a scan linearly proportional to $V_{scan}$.

Even though thermal expansion and other factors may effect various portions of the assembly, the feedback loop is thermally affected only by these portions of the apparatus between the mirrors and capacitance assembly 140. These are relatively small portions of the entire assembly and have minor thermal effects on the system accuracy.

There has thus been shown a vernier tandem Fabry-Perot interferometer which provides parallel alignment of the scanning mirrors over a scan movement of at least 10 microns. After a gross change of mirror spacing over a range of several centimeters, the mirror alignment is maintained sufficiently accurate that strong spectral features are still discernable in the scan spectrum allowing a simple and rapid realignment of the mirrors. A deformable parallelogram maintains parallelism of the mirrors during the scan while a transducer provides the force for translation. A feedback system is provided for correlating mirror spacing to the scan signal for linearizing the scan and providing a high degree of thermal stabilization.

What is claimed is:

1. A tandem Fabry-Perot interferometer comprising:
   a first plane mirror Fabry-Perot interferometer whose mirror spacing can shift in value and which radiates an output light signal in response to an applied light input signal, the mirrors of said first interferometer being normal to said applied light signal, said output signal comprising a series of equally spaced pass bands of visible radiant energy in a given wavelength range, each pass band having a mean wavelength which is a function of the value of the spacing between the mirrors of said interferometer,
   a second plane mirror Fabry-Perot interferometer whose mirror spacing can shift in value and which is responsive to said output signal applied as an input thereto, the mirrors of said second interferometer being normal to said applied output light signal, the mirror spacing of the second interferometer having a value sufficiently different from said first value so that the pass bands of the two interferometers at one wavelength coincide and the pass bands adjacent the one wavelength of one of the interferometers are displaced in wavelength sufficiently from the pass bands adjacent the one wavelength of the other interferometer so that substantially only the one wavelength is passed by the second interferometer; and
   means for altering the value of said spacings by displacing one mirror with respect to the other mirror of each interferometer so that the ratio of the incremental change in said spacings is equal to the ratio of said spacings during said altering so that essentially one pass band is passed in said range by said second interferometer during said altering,
   wherein the normal to the mirrors of said first and second interferometers intersect, said tandem interferometer including light directing means positioned at the intersection of said normals to receive the output signal of said first interferometer and to redirect the received output signal to the mirrors of said second interferometer.

2. The tandem interferometer of claim 1 wherein said first and second interferometers each include a pair of spaced parallel mirrors, said means for altering the value of said spacings including support means for mounting one mirror of each said pair of mirrors on the same support means, and means for translating said support means including said one mirror in the same direction.

3. The tandem interferometer of claim 1 wherein said means for altering includes translating means for translating one mirror of each said first and second interferometers with respect to the other mirror of that interferometer in response to an applied scan signal, said translating means tending to be non-linear with respect to said scan signal, said means for altering including means responsive to the mirror spacing for linearizing said translating with respect to said scan signal.

4. The tandem interferometer of claim 3 wherein said means responsive to the mirror spacing includes capacitor means whose dielectric spacing is linearly related to the value of said mirror spacings, capacitance measuring means for producing a spacing signal whose value represents the value of said dielectric spacing, and means responsive to said scan signal and said spacing signal for generating a signal for operating said translating means.

5. A tandem Fabry-Perot interferometer comprising:
a first pair of spaced plane mirrors forming a first Fabry-Perot interferometer radiating an output signal therefrom in response to an applied radiant input signal, said output signal comprising a series of equally spaced pass bands of radiant energy in a given wavelength range, each pass band having a mean wavelength which is a function of the spacing of said mirrors,
a second pair of spaced plane mirrors forming a second Fabry-Perot interferometer,
said first and second pairs of mirrors being oriented normal to an applied input signal beam,
signal directing means for directing the output signal of said first interferometer as an input signal normal to the mirrors of said second interferometer,
means for mounting the mirrors with the spacing between said second pair of mirrors sufficiently different from the spacing of said first pair of mirrors so that the pass bands of the two interferometers at one wavelength coincide and the pass bands adjacent to one wavelength of one of the interferometers are displaced in wavelength sufficiently from the pass bands adjacent the one wavelength of the other interferometer so that substantially only the one wavelength is passed by the second interferometer, and
means for synchronously reciprocating one mirror of each said pair in the same direction so that said spacings are increased and decreased in magnitude synchronously, said mirrors being so placed such that the ratio of the incremental change of said spacings during said reciprocating is equal to the ratio of said spacings wherein essentially one pass band is passed in said range by said second interferometer during said reciprocating,
said first pair of mirrors being positioned adjacent the second pair of mirrors with the planes of the pairs intersecting at an angle $\theta$, with the spacing between the first pair of mirrors being a distance $L$, and with the spacing between the second pair of mirrors being a distance $L \cos \theta$, where $\theta$ is less than 90°.

6. The tandem interferometer of claim 5 wherein one mirror of each said pair of mirrors is mounted in a relatively fixed position and the other mirrors of each said pair are movably mounted for translation in a direction parallel to the normal to one of said pair of mirrors, said signal directing means being mounted in a relatively fixed position at the intersection of the normals to said pairs of mirrors for reflecting the signal from said one pair of mirrors to the other pair of mirrors.

7. A scanning Fabry-Perot interferometer comprising:
a pair of spaced parallel plane mirrors,
a base member on which is fixed one of said mirrors,
support means on which is fixed the other of said mirrors, said support means including means movably mounting the support means to said base for translation in a direction parallel to the normal to said mirrors while maintaining the mirrors substantially interferometrically parallel, and
support drive means for cyclically translating the support means with respect to said base member to thereby alter the spacing of said mirrors in a scanning mode,
said support means being movable at least several orders of magnitude greater than the spacing of said mirrors in said scanning mode in said direction parallel to the normal,
said support drive means including means for receiving a scan signal, transducer means responsive to said scan signal for displacing the support means with respect to said base to thereby alter the spacing of said mirrors, said transducer means tending to have a non-linear response to said scan signal, and linearity correcting means responsive to said displacement and received scan signal for generating a transducer drive signal which causes said transducer means to displace said mirrors linearly with respect to the valve of said scan signal.

8. The interferometer of claim 7 wherein said linearity correcting means includes means for generating a spacing signal representing the instantaneous value of said mirror spacings and means responsive to said received scan and spacing signals for generating said drive signal.

9. The interferometer of claim 7 wherein said support means includes a support member to which said other mirror is fixed and a pair of flexible spaced parallel membrane members between said base member and said support member parallel to said mirrors forming a deformable parallelogram with said support member and said base member for translating said support member in said direction parallel to said normal in response to an applied force, and displacement means coupled to said support member and said base member for applying said force to said support member to thereby translate said support member with respect to said base member deforming said membrane members and altering the spacing of said mirrors.

10. A Fabry-Perot interferometer comprising:
a base,
a first plane mirror fixed to the base,
a support member,
a second plane mirror fixed to the support member parallel to said first mirror forming a Fabry-Perot optical resonant cavity therewith,
an intermediate member between said support member and said base, first and second spaced flexible plane members fixed to said support and said intermediate members parallel to said mirrors, displacement means for cyclically displacing said support member with respect to said intermediate member in a direction normal to said mirrors to alter the spacing between said mirrors in response to an applied scan signal, said plane members being oriented to flex in response to said displacing without altering the parallelism of said mirrors, and means for displacing said intermediate member with respect to said base in a direction normal to said mirror.

11. The interferometer of claim 10 wherein said displacement means includes mirror spacing determining means for generating a spacing signal representing the value of the mirror spacing, transducer means between said support member and said intermediate member responsive to an applied input signal for effecting said cyclically displacing, said transducer means tending to displace non-linearly with said applied input signal over a range of values of said input signal, and means for comparing said spacing signal and said scan signal applied thereto for generating said input signal, said input signal being altered in a direction which tends to linearize said spacing with said scan signal.

12. The interferometer of claim 11 wherein said determining means includes capacitance means coupled to said mirrors having a capacitance whose plate spacing varies linearly with said mirror spacing and capacitance measuring means for measuring the value of said capacitance and generating said spacing signal whose value varies linearly with the spacing of the capacitor plates.

13. A scanning Fabry-Perot interferometer comprising:

a pair of spaced parallel plane mirrors forming a Fabry-Perot optical cavity, first displacement means for displacing one of said mirrors within a first scanning displacement range about a mean mirror spacing while maintaining said mirrors substantially interferometrically parallel, and second displacement means for setting said mean mirror spacing within a second range much greater than said first range for providing coarse adjustment of said mirror spacing while maintaining said mirrors substantially interferometrically parallel, said first displacement means including first mounting means to which one of said mirrors is fixed and second mounting means to which the other mirror is fixed, and means connected to both said mounting means arranged so that said mirrors remain interferometrically parallel when displaced in said first and second ranges, said first displacement means including piezoelectric transducer means connected between said first and second mounting means for displacing said mirrors within said first range, said second displacement means comprises third mounting means including roller bearing means connected to said first and second mounting means for displacing said mirrors within said second range.

14. The interferometer of claim 13 further including feedback means including mirror spacing measuring means for generating a spacing signal, means for receiving a scan signal, and means for thereby generating a transducer signal when said scan signal and said spacing signal differ in value to correct non-linearities between said mirror spacing and said transducer signal.

15. An interferometer comprising, in combination:

a first Fabry-Perot interferometer (FP) having a pair of plane mirrors spaced a distance $L_1$ from one another, the mirrors being oriented normal to the input light signal beam, a second FP having a pair of plane mirrors spaced a distance $L_2$ from one another, where $L_2$ differs from $L_1$, means during operation of said first and second FP's for applying the light signal produced as an output from said first FP as an input to said second FP, the mirrors of said second FP being oriented normal to the light signal beam from said first FP, means for concurrently adjusting the spacing between the pair of mirrors of the first FP and the pair of mirrors of the second FP by displacing one mirror with respect to the other mirror of each interferometer while maintaining the ratio $L_2/L_1$ constant, and the plane of the mirrors of the first FP and the second FP intersecting at an angle $\theta$ less than 90°.

16. The interferometer of claim 15 wherein said spacings have a ratio of $L_2/L_1 \approx 0.95$.

17. An interferometer comprising, in combination:

a first Fabry-Perot interferometer (FP) having a pair of plane mirrors spaced a distance $L_1$ from one another, the mirrors being oriented normal to the input light signal beam, a second FP having a pair of plane mirrors spaced a distance $L_2$ from one another, where $L_2$ differs from $L_1$, the mirrors being oriented normal to the light signal beam from the first FP, means during operation of said first and second FP's for applying the light signal produced as an output from said first FP as an input to said second FP, and means for concurrently adjusting the spacing between the pair of mirrors of the first FP and the pair of mirrors of the second FP by displacing one mirror with respect to the other mirror of each interferometer while maintaining the ratio $L_2/L_1$ constant, one mirror of each said FP being fixed to the same support, and said means for concurrently adjusting including means for moving the same support in a direction normal to the mirrors of said first FP.

18. The interferometer of claim 17 further including additional support means for movably mounting said same support in said direction normal to said mirrors for providing coarse adjustment of the spacings of said mirrors.

* * * * *